Patented Feb. 5, 1946

2,394,306

UNITED STATES PATENT OFFICE 2,394,306

PROCESS OF PRODUCING NITROGENOUS CONDENSATION PRODUCTS

Winfrid Hentrich, Rodleben, near Dessau-Rosslau, Anhalt, and Erik Schirm, Dessau, Anhalt, Germany; vested in the Alien Property Custodian No Drawing. Application September 13, 1939, Serial No. 294,670. In Germany September 20, 1938

5 Claims. (Cl. 260—249.5)

This invention relates to capillary-active condensation products and to their production and more particularly to capillary-active condensation products obtained by condensing heterocyclic compounds containing at least one —C(Hal)=N— group with organic compounds containing at least one non-tertiary amino group, the latter compounds having at least one lipophile group either before the condensation or introduced therein after the condensation.

The principal object of this invention is to provide various industries such as the leather, paper and particularly the textile and allied industries with an effective and stable class of capillary-active agents, especially suitable as assistants in various treating operations. Another object of the invention is to provide a simple and feasible method for producing valuable capillary-active compounds which find utility in industry wherever dispersing, emulsifying, foaming, wetting, impregnating, peptizing, stabilizing, equalizing, distributing, dissolving, cleaning and the like are problems.

According to the principal embodiment of the instant invention, commercially valuable condensation products are produced by condensing heterocyclic compounds having at least one —C(Hal)=N— group with at least one water-soluble non-tertiary amino compound having at least one lipophile group. The resulting compounds have at least one

group where X represents the radical of a water-soluble non-tertiary amino compound having at least one lipophile group. When the heterocyclic compounds contain more than one, that is at least two, —C(Hal)=N— groups, one or more of the halogen atoms may be replaced by the aforesaid water-soluble organic non-tertiary amino compounds while the remaining halogen atoms may be replaced by substituted or unsubstituted amino, mercapto or hydroxyl groups or the like. The water-soluble non-tertiary amino radicals containing lipophile groups and the other substituent radicals may be introduced into the molecule at the heterocyclic ring in any desired order.

In accordance with another procedure, the condensation products of the instant invention are obtained by condensing the heterocyclic compounds in separate steps with the components which normally react to produce the foregoing condensation products instead of with the compounds themselves. For instance, instead of condensing the heterocyclic compounds with the water-soluble non-tertiary amino compounds containing the lipophile groups per se, an amino compound which does not contain water-solubilizing and lipophile groups is substituted on the heterocyclic ring, and the water-solubilizing or lipophile groups are introduced subsequently through the medium of the previously substituted amino compounds. The substituted hydroxyl, mercapto, and amino radicals which may be introduced at the ring, may be introduced in separate steps or in a single step, either before or after the foregoing steps.

The heterocyclic compounds having at least one —C(Hal)=N— group, used as raw materials in the instant process include various azines, azoles and the like, for instance such compounds as: 2-chlor-benzoxazole, 2-chlor-benzthiazole-1-phenyl-5-chlor-(1,2,3)-triazole; 2-brom-pyridine, 2,4 - di-chlor-quinoline, 9 - chlor-acridine, chlor-pyridazine, mono-, di- or trichlor-pyrimidine; 2-chlor- or 4-chlor or 2,4-dichlor-quinazoline, and their Bz-substitution products, such as chlor-quinazoline-7-carbonic acid chloride, quinoxaline halogenated in the heterocyclic ring, for instance, 2,3-dichlor-quinoxaline and its Bz-substitution products; C-halogen derivatives of the 1,3,5-triazine, such as 2-methyl-, 2-benzyl-, 2-cyclohexyl-4,6-dichlor-triazine-1,3,5; 2,4 - diphenyl-6-chlor-triazine-1,3,5; 2-mono- or 2,4-di-alkoxy-6-chlor-triazine-1,3,5, 2-anilino- or n-dodecyl amino-, 4,6-dichlor-triazine-1,3,5, 2,4,6-trichlor- or tri-brom-triazine-1,3,5, i. e., cyanuric chloride or bromide as well as analogous heterocyclic compounds. Such mono- and polycyano compounds are preferably derivatives of the oxazoles, thiazoles, imidazoles, or pyridines, or of the group of the di- and triazines which, if desired, may also be substituted by hetero-atoms, or hetero-atomic groups or any other desired organic groups.

Organic non-tertiary amino compounds containing at least one primary and/or secondary amino group and also at least one lipophile group suitable for condensing with the heterocyclic compounds are, for instance: beta-dodecyl-amino-ethyl-sulfuric acid; beta-octadecenyl-amino-ethane-sulfonic acid; alpha-amino-fatty acids having 8 to 18 hydrocarbon atoms; dodecyl-amino-succinic acid; N-cyclohexyl-glycocoll; N-tetrahydro-menaphthyl-glycocoll; 4-dodecyl-anilino-acetic acid; 4-hexadecyl-oxy-anilino-acetic acid; 4(beta-ethyl-hexyl) anilino-ethane-sulfonic acid; sodium salt of 4-octyl-anilino-ethyl-sulfuric acid; 1-amino-4-dodecyl-amino-benzene-3-sulfonic acid; 1,3-dioctyloxy-6-amino-benzene-4-sulfo-acid; N-dodecyl-amino-benzene or N-dodecyl-amino-naphthalene mono- or polysulfonic acids; N-decyl-benzyl-amino-p-sulfonic acid; 1- amino-4-lauroyl-amino-benzene-2-sulfonic acid;
N-(dodecyl-amino-acetyl)-sulfanilic acid; 1-amino-4-dodecoxy-benzene-3-sulfonic acid; 2-tridecyl-benzimidazole-sulfonic acid; (2-amino-4-lauroyl-phenyl-)-beta-sulfo-ethyl ether of the formula

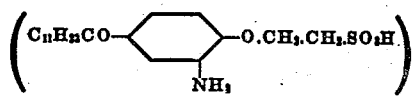

N-octyl-anthranilic acid. N-dodecyl-5-sulfo-2-amino-benzoic acid; 1-dodecyl-amino-benzene-3-trimethyl-ammonium-chloride; 1-N-di-methyl-amino-acetic acid-N-dodecyl-(4-amino-phenyl) amide or its chlor-methylate of the following formula:

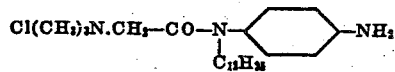

and the like.

The water-solubilizing groups contained in the foregoing compounds may be replaced by other groups known to impart water-solubility.

The condensation between the heterocyclic compounds containing at least one

group and the non-tertiary water-soluble amino compounds readily takes place under mild conditions in the presence of suitable dissolving or diluting agents and especialy smoothly in the presence of acid-binding agents. Water is a preferred dissolving agent while suitable acid-binding agents include such compounds as sodium acetate, alkali or alkaline-earth formates, carbonates, oxides, hydroxides, pyridine and the like. In most cases quantitative yields can be produced by operating at preferred temperatures ranging between 0° and 100° C. If more strenuous conditions are desired, the condensation may be carried out in a closed vessel and the temperature may be raised to 200° C.

As is previously mentioned, it is not necessary to substitute the water-soluble non-tertiary amino derivatives for all of the halogen atoms when operating with heterocyclic compounds having two or more —C(Hal)=N— groups. The number of halogen atoms replaced by the non-tertiary amines and the other substituents depends largely upon the use to which the products are to be put and the properties desired therein. Satisfactory compounds may be produced by replacing only one of the halogen atoms and leaving one or more halogen atoms attached to the heterocyclic ring. However, the halogen atom remaining after the introduction of the non-tertiary amino derivative may be replaced by hydroxyl, amino, mercapto or disulfide groups through conversion brought about by the use of alkalies, such as, for instance, caustic soda, ammonia or sulfur alkalies. The halogen atoms may also be replaced by organic hydroxyl, amino or mercapto compounds containing desirable acyclic or cyclic hydrocarbon groups or such groups containing hetero-atoms, hetero-atomic groups or water-solubilizing groups. Such hydroxy, amino, and mercapto groups may be designated as RR'N—, RS—, or RO— groups where R and R' are hydrogen or an interrupted hydrocarbon group or an uninterrupted hydrocarbon group.

In accordance with another embodiment of the invention, two or more heterocyclic compounds may be linked together by condensing such compounds containing unreacted halogen atoms with such compounds as acyclic and cyclic di- or polyamines and especially with aliphatic and aromatic, di- or polyamines. In such condensation, the sequence of steps is not of primary importance as the water-soluble non-tertiary amines containing a lipophile group may be substituted on the heterocyclic ring before or after the condensation with the polyamines.

When it is desirable to introduce the water-soluble non-tertiary amino compounds containing at least one lipophile group onto the heterocyclic ring in several steps, the heterocyclic raw materials are condensed, for instance, with primary or secondary aromatic amines containing higher molecular hydrocarbon groups and the condensation products are then sulfonated; or the heterocyclic raw materials are condensed first with aromatic-amino-nitro-sulfonic acids and then the nitro-groups of the condensation products are reduced to amino groups and acylated with higher molecular fatty or naphthenic acid halogenides. In accordance with another practice for the stepwise formation of the condensation products of the invention, the heterocyclic compounds are condensed with amino phenols after which the resulting condensation products are further condensed with higher-molecular olefines in the presence of a catalyst, and finally, the product is rendered water-soluble by reacting it with a sulfonating agent or with an excess of ethylene oxide to introduce water-solubilizing groups. In accordance with yet another practice, unsymmetric dialkylated aromatic diamines having at least one higher molecular alkyl group are reacted with the heterocyclic compounds after which the tertiary amino-groups of the condensation products are converted into water-soluble quaternary ammonium groups by treatment with alkyl-halogenides, benzyl-chloride, dimethyl-sulfate or the like. The stepwise introduction of the water-soluble non-tertiary amino compounds having at least one lipophile group is not limited to the foregoing examples, for it also may be carried out in accordance with other customary methods known to be operable in such organic syntheses.

The water-soluble non-tertiary amino compounds containing a lipophile group used as raw materials in the present process have capillary properties per se, but these capillary properties, however, are materially increased and improved by condensation with the heterocyclic compounds, which effect is probably due to the peculiar modification in the structure and the increase in the size of the resulting molecule. The compounds of the instant invention form saponaceous colloidal solutions in water which are stable even in acid-treating baths. This characteristic constitutes an additional advantage in view of the fact that many of the water-soluble amino compounds used as raw materials cannot be used in acid baths due to their acid sensitivity.

Due to excellent capillary and colloidal properties, the condensation products of the instant invention have extensive utility in industrial processes. They may be used in varied industries for the production of foam and as emulsifying, dispersing, wetting, impregnating, peptising, stabilizing, equalizing, spreading, dissolving agents and the like. They may be used as assistants in the paper, leather, pelt and especially in the textile industry in widely varied operations, for instance in brightening, stiffening, glazing and sizing processes. These condensation products are useful also especially for washing, cleaning and bleaching of textiles of various kinds, such as lingerie, household articles and the like. The compounds may even be used for cleansing the human body.

Furthermore the condensation products produced in accordance with the teachings of the present invention may be used advantageously in the preparation of impregnations suitable for use in dyeing operations. For instance, they may be used with substantive dyes, for the post treatment of dyed material and especially for rendering directly dyed cellulose fibers color fast; also with vat dyes, and for the preservation of wool against substantive dyes and the like.

Some of these products also possess the surprising quality of being disinfectant in character and can be used advantageously either as disinfectants per se or as agents for simultaneously cleaning and disinfecting. Certain of the products, due to their tanning properties, are valuable for use in the tanning industry.

The following examples, in which the parts are expressed in parts by weight, will serve to illustrate the processes and products of the invention.

Example 1

One hundred and sixty-five parts of 4-chlor-quinazoline, 331 parts of the sodium salt of beta-n-dodecyl-amino-ethyl-sulfuric acid, 150 parts of crystalline sodium acetate and 3000 parts of 50% alcohol are boiled under reflux for several hours. Upon cooling, the condensation product separates out in a pulp and has the following formula:

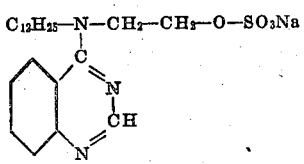

Upon filtering, strongly pressing off the excess water, and drying, a grey amorphous powder is obtained which forms a colloidal solution in hot water and gives off a strong foam. The solution is not precipitated by mineral acids.

Example 2

A moderately heated and concentrated aqueous solution of 126 parts of the sodium salt of beta-n-dodecyl-amino-ethane sulfonic acid are gradually added to a suspension of 37 parts of cyanuric chloride in 1000 parts of ice water while maintaining and thoroughly stirring the reaction mass at a temperature of 0° to 5° C. Then 60 parts of crystalline sodium acetate are added and the stirring is continued for a half hour at the same temperature. Finally the mixture is heated, while being stirred constantly, to a temperature of 45° C. and is kept at a temperature of 45° to 50° C. until a test indicates there is no further increase in the amount of free acetic acid. The resulting compound has the following structural formula:

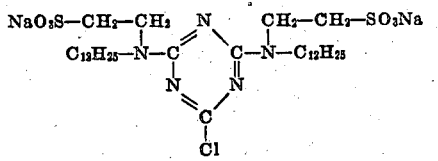

The condensation product may be isolated from the reaction mixture by salting out, and may be used as such. However, the remaining chlorine atom may be substituted by any desired inorganic or organic groups which contain replaceable hydrogen atoms bound to oxygen, sulfur or nitrogen.

Example 3

The secondary condensation product of Example 2 is prepared as described therein. After the formation of this secondary condensation product is completed, the reaction mass is carefully neutralized with sodium-bicarbonate at a temperature of 45° to 50° C. Then 12 parts of ethylene-diamine are added and the mixture is heated for 4 to 5 hours in an autoclave to a temperature of 120° to 130° C. Then the excess amine is carried off with water-vapor and the reaction product is salted out, filtered and dried. A condensation product is obtained having two cyanuric derivatives of the nature of those described in Example 2 joined to one another through an ethylene di-imino bridge. This bridge is formed by replacing the unreacted chlorine in each of the secondary condensation products.

Example 4

A moderately heated and concentrated, aqueous solution of 189 parts of the sodium salt of beta-n-dodecyl-amino-ethane-sulfonic acid is stirred gradually into a finely divided suspension of 37 parts of cyanuric chloride in 1000 parts of ice water, prepared in the customary manner, at a temperature not exceeding 5° C. Then 90 parts of crystallized sodium acetate are added. The reaction mass is stirred for an additional half hour at a temperature of 0° to 5° C., heated to 90° C. during the course of an hour, kept at such temperature for an additional half-hour, and then carefully neutralized with sodium-bicarbonate. The conversion is known to be completed when the reaction mixture, upon further heating, fails to show a tendency to become acid. Upon filtering and drying an amorphous white powder is obtained which forms a clear colloidal strongly foaming solution in warm water.

Example 5

The sodium salt of the beta-dodecyl-amino-ethane-sulfonic acid of Example 4 is replaced with 210 parts of the sodium salt of 1-amino-4-decyl-amino, benzene-3-sulfonic acid (prepared by conversion of n-decyl-amine with the sodium salt of 4-nitro-1-chlorbenzene-2-sulfonic acid in the presence of acid-binding agents and subsequent reduction of the nitro-group) and dissolved in the required quantity of water at a temperature of approximately 45° C. The reaction process is otherwise continued as described in Example 4, and a reaction product is obtained which is very similar to the one described therein. The reaction product also shows similar colloidal properties.

Example 6

A concentrated aqueous solution of 627 parts of the sodium salt of N-octyl-glycocoll is stirred into a finely divided suspension of 185 parts of cyanuric chloride in 5000 parts of ice water at a temperature of 0° to 5° C. After stirring for half an hour at a temperature of 0° to 5° C., the temperature is allowed to rise to 20° C. and the reaction mass is treated gradually and carefully with as much sodium carbonate as is possible without the appearance of an alkaline reaction to litmus. Then the reaction mass is heated slowly up to 90° C. and additional sodium bicarbonate is carefully added until a stable reaction mass is obtained. After cooling slightly, the symmetrical trioctyl-melamine-tri-acetic acid reaction product is precipitated by the addition of hydrochloric acid. A white powder is obtained which is colloidally soluble and capable of foaming in alkaline solutions.

Example 7

A solution of 173 parts of water-free sulfanilic acid in just the required quantity of diluted caustic soda is added to a suspension of 185 parts of cyanuric chloride in 5000 parts of ice water at a temperature of 0° to 5° C. After stirring for half an hour, 331 parts of the sodium salt of beta-n-dodecyl-amino-ethyl-sulfuric acid are added in a lukewarm concentrated aqueous solution. Then 300 parts of crystallized sodium acetate are added and the temperature is slowly raised to 45° C. and kept at this temperature until the second condensation is complete. After a careful neutralization with sodium bicarbonate a concentrated aqueous solution of 209 parts of the sodium salt of N-octyl-glycocoll are added and the reaction mass is heated to 90° to 100° C. until the glycocoll is completely bound to the cyanuric acid nucleus. Upon salting out, filtering and drying, a water-soluble saponaceous condensation product is obtained.

Example 8

The condensation product prepared from 1 mole of cyanuric chloride (185 parts) and 1 mole of sulfanilic acid is prepared as in the foregoing example. The ice-cold suspension is treated carefully with sodium carbonate until Congo-paper is just slightly blackened. Then a concentrated aqueous solution of 223 parts of the sodium salt of omega-amino undecane acid is added, and thereafter 150 parts of crystallized sodium acetate are added and the mass is heated to 50° C. and maintained at this temperature until the second condensation is finished. The condensation product obtained may be worked up as heretofore described. The product is water-soluble and yields strongly foaming saponaceous solutions. If it is desirable to do so, the third chloride atom of the cyanuric chloride may also be replaced with an inorganic or organic group.

Example 9

Ten parts of 2,4-dichlor-quinazoline, 42 parts of N-dodecyl, N-dimethyl-amino-acetyl-p-phenylene-diamine-chlormethylate of the following formula:

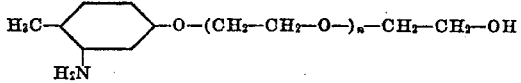

(prepared by condensing betaine-hydrochloride with N-dodecyl-p-nitraniline in accordance with German patent application D.71,289 IVc/12o, and subsequent reduction of the nitro-group), 15 parts of crystalline sodium acetate and 500 parts of 50% acetone are boiled under reflux condenser for several hours until the completion of the conversion. After cooling, the reaction product is separated, filtered and dried. It dissolves in hot water while foaming heavily.

Example 10

A condensation product is prepared in the customary manner from 1 mole (185 grams) of cyanuric chloride and 1 mole of 2-amino-naphthalene-6,8-disulfonic acid. Four hundred and seventy-five grams of the sodium salt of the 1-amino, 4-oleoyl-amino benzene-2-sulfonic acid (prepared by condensation of oleic acid chloride with p-phenylene diamine sulfonic acid) and 300 grams of crystalline sodium acetate are added to the ice cold solution and the resulting admixture is heated at a temperature of 45° to 50° C. until the second condensation is finished. The reaction product is salted out, the precipitate is separated sharply by suction and the residue is boiled under a reflux condenser with 10 liters of 50% alcohol while adding 1 mole of crystallized sodium acetate and 1.5 moles of a mixture of fatty amines containing 7 to 9 carbon atoms (such amines may be obtained from synthetic fatty acids having 7 to 9 carbon atoms by high-pressure reduction, conversion of the so-obtained fatty alcohols into the alkyl-chlorides and conversion of the latter with ammonia), and the boiling is continued until the last chlorine atom of the cyanuric chloride is replaced with the fatty amine group. The liquid is rendered alkaline with caustic soda, the alcohol and excess amine is distilled off, the remaining hot solution is saturated with sodium chloride, cooled off, and the precipitate is then filtered and dried. The condensation product obtained is a light-grey powder which is easily soluble in hot water and forms a colloidal foaming solution.

Example 11

One hundred and fifty-three parts of 3-nitro-4-methyl-phenol are heated with 2000 parts of toluol and 5 parts of sodium ethylate in an autoclave to a temperature of 100° C. and 1320 parts of ethylene oxide are introduced under pressure at a temperature of 100° to 120° C. as the reaction progresses. After the completion of the reaction, which is indicated by a decrease in pressure, the toluol is distilled off, the residue is dissolved in water and the aqueous solution is reduced in the customary manner with iron and a little acetic acid. The solution is freed from iron by filtration and gives a polyglycol-ether of 3-amino-4-methyl-phenol of the general formula:

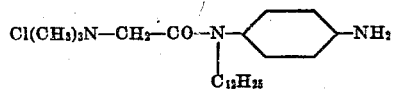

The alkaline solution is made exactly neutral to litmus with hydrochloric acid and is added gradually to a finely divided suspension of 185 parts of cyanuric chloride and 5000 parts of water at a temperature of 0° to 5° C. After the cyanuric chloride is dissolved, a warm alcoholic solution of 627 parts of alpha-amino-stearic acid methyl-ester is poured in, while raising the temperature to 20° C., and 450 parts of crystalline sodium acetate are added. The reaction mass is stirred for an hour at a temperature of 50° to 55° C. and then heated at 90° C. until the third chlorine atom of the cyanuric chloride is replaced and the alcohol is distilled off, then the reaction mass is made permanently and slightly alkaline to phenolphthalein by adding caustic soda. The disodium salt of p-cresyl-polyglycol-ether, di-alpha-stearic acid melamine obtained as a reaction product is salted out, filtered and dried. It forms an amorphous, greasy feeling powder, which forms a very colloidal solution similar to soap-lye in hot water.

Example 12

One hundred and eighty-five parts of cyanuric chloride are dissolved in 1400 parts of xylol. A concentrated solution of 915 parts of p-methoxybenzyl, n-dodecyl amine in xylol as well as 200 parts of calcium carbonate is added to the aforesaid solution. The reaction mixture is heated on the reflux condenser while stirring for 4 to 5 hours until the solvent boils. Then the xylol is blown off with water vapor and the finely pulverized residue is drawn out with diluted hydrochloric acid, in order to eliminate the calcium compounds, washed with water and dried. Now the condensation product is introduced into the five-fold quantity of concentrated sulfuric acid and the mixture is heated at a water-bath temperature until a sample dissolves clearly in a warm soda solution. Then the sulfonation mixture is poured on ice, the liquid saturated with sodium chloride, the precipitate filtered, dissolved in hot diluted sodium lye, salted out hot, filtered and again dried.

Example 13

Twenty parts of 1,4-dichlor-phthalazine are dissolved in acetone and the solution is stirred into 6000 parts of ice water in the customary manner. Then a solution of 17.2 parts of benzidine-2,2'-disulfonic acid and 4 parts of sodium hydroxide in 50 parts of water are added and hereupon 15 parts of crystallized sodium acetate are added. After stirring for half an hour at a temperature of 0 to 5° C. the temperature is allowed to rise to 20° C. and the mixture is stirred at a temperature of 20 to 25° C. until a clear solution resulted containing the intermediate product of the following formula:

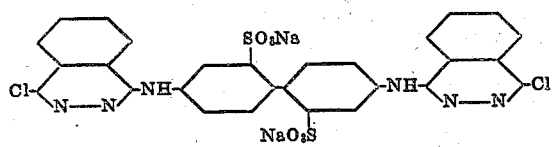

Then a moderately heated and concentrated aqueous solution of 38 parts of monosodium salt of the cetyl-amino-succinic acid (obtained by conversion of bromo succinic acid with cetyl amine) is added, the mixture is slowly heated up to boiling and maintained by temporary addition of sodium carbonate at a slightly alkaline reaction to litmus until the completion of the conversion. After acidifying with hydrochloric acid and cooling down to room-temperature the condensation product is filtered off. It is soluble in alkaline liquids to strongly foaming solutions.

Example 14

To a solution cooled with ice of 396 parts of tetra-bromo-pyrimidine in toluene a solution of 23 parts of sodium in 500 parts of alcohol is slowly added while stirring thoroughly. Then the mixture is stirred at a temperature of 0 to 5° C., heated to 20° C. and after stirring during the course of an hour at a temperature of 20 to 25° C. toluene and alcohol are distilled off while slightly heating. The residue consisting of 4-ethoxy-2,5,6-tribromo-pyrimidine and sodium bromide is washed with ice-water and, after stirring with a little cold water, carried in an aqueous solution of 429 parts of disodium salt of alpha-(para-sulpho-benzylamino) lauric acid of the formula:

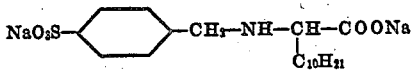

The mixture is heated at water-bath until a test of the solution indicated the presence of approximately 80 parts of ions of bromine. Then a concentrated aqueous solution of 164 parts of beta-mercapto-ethane sulfonate of sodium and 80 parts of sodium hydroxide is added and heating continued until the mercapto-ethane sulphonic acid is disappeared. The solution is salted out, cooled down, and the residue is filtered and dried. Corresponding to its structure the condensation product shows the following formula:

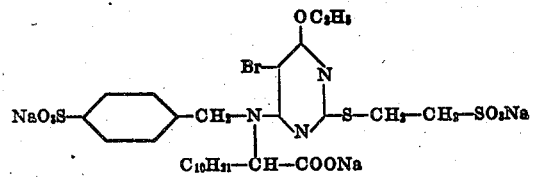

In the herein-appended claims, where the term "lipophile" is not already defined, it is used to mean aliphatic hydrocarbon groups composed of a chain of at least six carbon atoms, which hydrocarbon groups in combination with balancing water-solubilizing groups provide compounds having capillary activity.

It should be understood that the present invention is not limited to the specific processes, compounds, and compositions herein disclosed but that variations and changes may be made in these processes, compounds, and compositions without departing from the spirit of the application or the scope of the appended claims.

We claim:

1. A new compound composed of a nucleus of two heterocyclic rings, said rings being selected from the group consisting of azine and azole nuclei and being joined through a polyamine bridge attached to nuclear carbon atoms, each of said rings having at least two

groups therein, said nucleus having linked to a carbon atom of each ring at least one amino radical of the following structure

in which $R_1$ is a lipophilic straight chain aliphatic hydrocarbon group having at least eight carbon atoms, $R_2$ is a water-solubilizing group and the remaining nitrogen bond is connected to the carbon atom of the ring, and any remaining nuclear carbon atoms are substituted by a member selected from the group consisting of halogen, hydroxy, mercapto, and ether radicals.

2. A capillary-active compound composed of a single heterocyclic nucleus selected from the group consisting of azine nuclei and azole nuclei, said nucleus containing from one to three

groups wherein one X is a substituted amino radical of the structure

in which $R_1$ is a lipophilic straight chain aliphatic hydrocarbon group having at least eight carbon atoms, $R_2$ is a low molecular hydrocarbon group containing a water-solubilizing group and the remaining nitrogen bond is connected to the carbon atom of the ring, said radical being derived from a secondary amine by replacing its reactive hydrogen atom, any remaining X's being halogen atoms.

3. A capillary-active compound composed of a single heterocyclic nucleus selected from the group consisting of azine nuclei and azole nuclei, said nucleus containing from one to three

groups wherein one X is a substituted amino radical of the structure

in which $R_1$ is an unsubstituted straight chain aliphatic hydrocarbon radical of at least eight carbon atoms, $R_2$ is a low molecular hydrocarbon group containing an acyl water-solubilizing group and the remaining nitrogen bond is connected to the carbon atom of the ring, said radical being derived from a secondary amine by replacing its reactive amino-hydrogen atom, and any remaining X's being selected from the group consisting of halogen, hydroxy, mercapto and ether radicals.

4. A capillary-active compound composed of a single heterocyclic nucleus selected from the group consisting of azine nuclei and azole nuclei, said nucleus containing from one to three

groups, wherein one X is an amino radical of the structure

in which $R_1$ is an unsubstituted straight chain aliphatic hydrocarbon radical of at least eight carbon atoms and $R_2$ is a low molecular hydrocarbon group containing a water-solubilizing group, and the remaining nitrogen bond is connected to the carbon atom of the ring, said radical being derived from a secondary amine by replacing its reactive amino-hydrogen atom, and any remaining X's being selected from the group consisting of halogen, hydroxy, mercapto and ether radicals.

5. A capillary-active compound composed of a single heterocyclic nucleus selected from the group consisting of azine nuclei and azole nuclei, said nucleus containing from one to three

groups, wherein the X's are amino radicals and at least one of them is an amino radical of the structure

in which $R_1$ is an unsubstituted straight chain aliphatic hydrocarbon group of at least eight carbon atoms and $R_2$ is a low molecular aliphatic hydrocarbon group containing a water-solubilizing group and the remaining nitrogen bond is connected to the carbon atom of the ring.

WINFRID HENTRICH.
ERIK SCHIRM.